(12) United States Patent
Nagendran et al.

(10) Patent No.: US 12,242,768 B2
(45) Date of Patent: Mar. 4, 2025

(54) SYSTEMS AND METHODS FOR COLLABORATING PHYSICAL-VIRTUAL INTERFACES

(71) Applicant: Mursion, Inc., San Francisco, CA (US)

(72) Inventors: Arjun Nagendran, San Mateo, CA (US); Brian D. Kelly, Orlando, FL (US)

(73) Assignee: Mursion, Inc., San Francisco, CA (US)

( * ) Notice: Subject to any disclaimer, the term of this patent is extended or adjusted under 35 U.S.C. 154(b) by 0 days.

(21) Appl. No.: 16/987,815

(22) Filed: Aug. 7, 2020

(65) Prior Publication Data

US 2022/0043622 A1   Feb. 10, 2022

(51) Int. Cl.
| | |
|---|---|
| *G06F 3/14* | (2006.01) |
| *G06F 3/0346* | (2013.01) |
| *G06T 11/60* | (2006.01) |
| *G06T 13/40* | (2011.01) |
| *G06T 13/80* | (2011.01) |
| *G09B 5/02* | (2006.01) |

(52) U.S. Cl.
CPC .......... *G06F 3/1454* (2013.01); *G06F 3/0346* (2013.01); *G06T 11/60* (2013.01); *G06T 13/40* (2013.01); *G06T 13/80* (2013.01); *G09B 5/02* (2013.01)

(58) Field of Classification Search
CPC ...... G06F 3/1454; G06F 3/0346; G06T 11/60; G06T 13/40; G06T 13/80; G09B 5/02
See application file for complete search history.

(56) References Cited

U.S. PATENT DOCUMENTS

| | | | |
|---|---|---|---|
| 10,373,342 B1* | 8/2019 | Perez, III | ................. G06T 7/97 |
| 2015/0097812 A1* | 4/2015 | Huang | ................. G06F 3/0304 |
| | | | 345/175 |
| 2018/0098059 A1* | 4/2018 | Valdivia | ............... H04N 13/398 |
| 2018/0165887 A1* | 6/2018 | Iwai | ......................... A63F 13/30 |
| 2018/0181199 A1* | 6/2018 | Harvey | ................... G06F 3/014 |
| 2018/0203502 A1* | 7/2018 | Kobayashi | ............. G06T 19/00 |
| 2020/0066049 A1* | 2/2020 | Sun | ......................... G06Q 10/10 |

\* cited by examiner

*Primary Examiner* — David D Davis
(74) *Attorney, Agent, or Firm* — Van Pelt, Yi & James LLP

(57) ABSTRACT

Aspects of systems and methods for collaborating physical-virtual interfaces are disclosed. In an example, a method may include transmitting digital content to display in a virtual environment that includes one or more human inhabited characters, the digital content corresponding to content displayed on one or more interactive devices. The method may also include receiving first input data representing content markup of the digital content from a first user of the first interactive device. The method may also include determining an action state or an appearance state for a human inhabited character in response to the first data. The method may also include transmitting the first input data to display in the virtual environment and transmitting the human inhabited character to display in the virtual environment according to the action state or the appearance state.

20 Claims, 6 Drawing Sheets

SYSTEMS AND METHODS FOR COLLABORATING PHYSICAL-VIRTUAL INTERFACES

BACKGROUND

The present disclosure relates to computing systems, and more particularly, to systems and methods for collaborating physical-virtual interfaces.

The animation of virtual characters is provided by computing systems in a variety of industries, such as the film industry, advertising, computing gaming, medical applications, and education, among others. In some virtual environments, virtual characters interact with each other and/or with objects within the virtual environments for users to receive immersive and interactive experiences. Additionally, these experiences may assist users with receiving educational and training experiences to develop psychologically, mentally, and socially. However, there is a need in the art for improvements to these interactive experiences.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method for collaborating physical-virtual interfaces is provided. The method may include transmitting, to one or more immersive devices, digital content to display in a virtual environment that includes one or more human inhabited characters, the digital content corresponding to content displayed on one or more interactive devices. The method may include receiving, from a first interactive device of the one or more interactive devices, first input data representing content markup of the digital content from a first user of the first interactive device. The method may include determining an action state or an appearance state for a human inhabited character of the one or more human inhabited characters in response to the first input data. The method may include transmitting, to the one or more immersive devices, the human inhabited character to display in the virtual environment according to the action state or the appearance state.

In another aspect, a method for collaborating physical-virtual interfaces is provided. The method may include receiving, from a first interactive device of one or more interactive devices, first input data representing content markup of digital content from a first user of the first interactive device, the digital content to be display in a virtual environment that includes one or more human inhabited characters. The method may include determining one or more points corresponding to the content markup and a time value of the content markup. The method may include synchronizing display of the first input data across the one or more interactive devices and the virtual environment of one or more immersive devices based on the one or more points and the time value.

In another aspect, a computing device is provided. The computing device may include a memory storing instructions, and a processor communicatively coupled with the memory. The processor may be configured to transmit, to one or more immersive devices, digital content to display in a virtual environment that includes one or more human inhabited characters, the digital content corresponding to content displayed on one or more interactive devices. The processor may be configured to receive, from a first interactive device of the one or more interactive devices, first input data representing content markup of the digital content from a first user of the first interactive device. The processor may be configured to determine an action state or an appearance state for a human inhabited character of the one or more human inhabited characters in response to the first input data. The processor may be configured to transmit, to the one or more immersive devices, the human inhabited character to display in the virtual environment according to the action state or the appearance state.

In another example, a computing device is provided. The computing device may include a memory storing instructions, and a processor communicatively coupled with the memory. The processor may be configured to receive, from a first interactive device of one or more interactive devices, first input data representing content markup of digital content from a first user of the first interactive device, the digital content to be display in a virtual environment that includes one or more human inhabited characters. The processor may be configured to determine one or more points corresponding to the content markup and a time value of the content markup. The processor may be configured to synchronize display of the first input data across the one or more interactive devices and the virtual environment of one or more immersive devices based on the one or more points and the time value.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for collaborating physical-virtual interfaces. Human inhabited characters may include, for example, avatars, animations, virtual characters, or holograms, among other types of images/embodiments used for real time (or live) interaction between a human that inhabits the character and another human inhabited character. In such live interactions, the human inhabited character may be controlled or embodied by a human user, sometimes called a human specialist (interchangeably referred to herein as a specialist, simulation specialist, inhabitor, or interactor). A human inhabited character is suited for emotionally complex and sensitive human interactions that cannot be replicated in a scripted artificial intelligence (AI)-driven system. Inclusion of a human in a virtual environment to control the character in real time allows another human, such as a trainee (interchangeably referred to herein as learner, end user, or person to be counseled), to experience a wider range of human emotions and non-verbal cues in an individualized experience not limited by scripted responses. The human inhabited character may respond like a real human being in real time.

Typically, a specialist may request one or more trainees to collaborate on work (e.g., solve problem, answer question) by displaying the work within the virtual environment. While conferencing systems and other software tools provide the ability to share whiteboards, these types of systems and tools may not allow shared collaborative work while trainees are immersed in virtual environment while wearing, for example, a headset (or head mounted display). In the absence of an interface between the physical and the virtual collaborative workspaces, attempts to share and exchange data may detract from an immersive experience (e.g. one can remove the headset to write on a physical surface and put the headset back on again).

According to aspects of the present disclosure, a collaborative workspace may be shared between interactive devices and within a virtual environment such that users may interact with each other in real-time. Aspects of the present disclosure also allow human-inhabited characters to respond to input from an interactive device by changing an action or appearance of the human inhabited character thereby providing an immersive environment for users. Aspects of the present disclosure further provide techniques for users of virtual reality (VR) devices, such as head mounted displays (HMDs), to interact with interactive devices while simultaneously using the VR devices.

Turning now to the figures, examples of systems and methods for collaborating physical-virtual interfaces on a computing system are depicted. It is to be understood that aspects of the figures may not be drawn to scale and are instead drawn for illustrative purposes.

Figure 1:
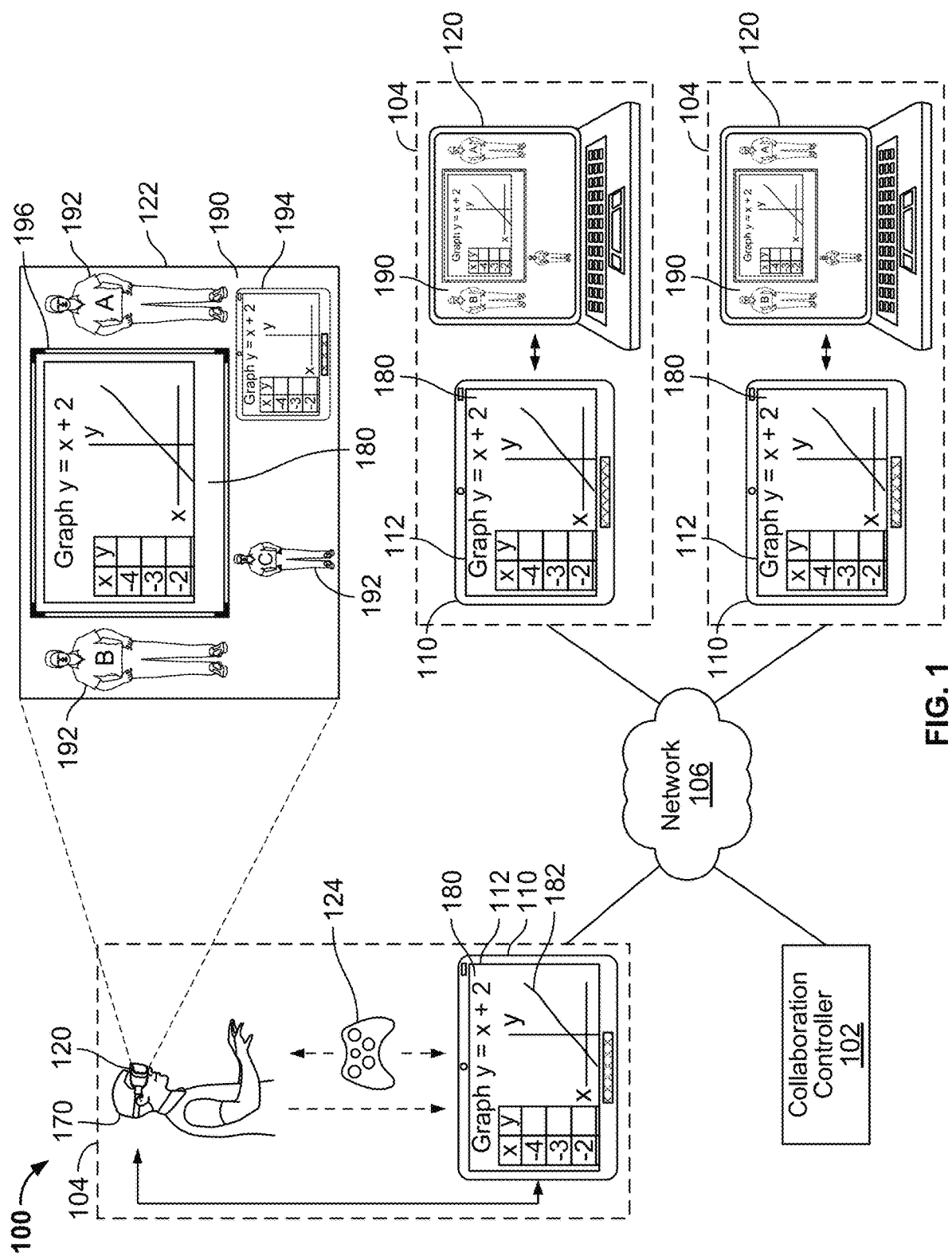
FIG. 1 is a conceptual diagram of an example system, according to aspects of the present disclosure.

Referring to FIG. 1, an example system 100 includes a collaboration controller 102 communicatively coupled one or more interactive systems 104 to via a network 106. Example implementations of the system may include, but are not limited to, shared collaborative problem solving (e.g., educational teaching or professional training), medical simulations (e.g., collaboration on patient charts or electrocardiogram (EKG or ECG)), or conferencing systems (e.g., shared tools for collaboration such as white-board markups).

In an example, the collaboration controller 102 may be a computing device that communicates with a specialist (not shown) to host and provide an interactive virtual environment 190. In an example, the collaboration controller 102 may synchronize data between a plurality of the interactive systems 104 such that collaborative workspaces are shared. Examples of the collaboration controller 102 may include a server, a computer, a laptop, a tablet, or any computing device configured to organize and manage the interactive virtual environment 190. The collaboration controller 102 may include artificial intelligence (AI) or a neural network trained to correlate inputs from one or more interactive devices 110 with action states or appearance states of one or more human-inhabited characters 192 of a virtual environment 190. Examples of the network 106 includes one or more of a local area network, wide area network, or the Internet, among other types of networks.

Each of the interactive systems 104 may include an interactive device 110 communicatively coupled with a corresponding immersive device 120. In an aspect, the interactive device 110 and the virtual device 120 may communicate via wireless communications (e.g., Bluetooth® or WiFi) or wired communications.

The interactive device 110 may include a display 112 for displaying digital content 180. In an example, the digital content 180 may include collaborative work provided by the specialist. The digital content 180 may include documents, images, or digital media stored on the interactive device 110 and/or received from the collaboration controller 102. In an aspect, the interactive device 110 may be configured to enable a user to interact with the digital content 180. For example, the interactive device 110 may include one or more digital editing tools that receives input from a user 170 of the interactive device 110 to markup, manipulate, and/or revise the digital content 180. The digital editing tools may include pens, pencils, highlighters, erasers, etc. As a non-limiting example, the interactive device 110 may receive content markup 182 to answer a question (e.g., mathematical question) on the digital content 180. Examples of an interactive device 110 may include a tablet, a laptop, a smartphone, or any other computing device for interacting with digital content 180.

As described herein, the collaboration controller 102 may synchronize data between a plurality of the interactive systems 104 but in an alternative example, two or more interactive systems 104 may synchronize data between each other without the use of the collaboration controller 102.

The immersive device 120 may include a display 122 for displaying the virtual environment 190 including one or more human-inhabited characters 192 or virtual objects such as a virtual device 194 or a virtual white-board 196. In an example, the virtual device 194 displayed by the display 122 may represent a corresponding interactive device 110. Examples of the immersive device 120 include head mounted displays (HMDs), laptops, tablets, or any other computing device configured to display a virtual environment. The immersive device 120 may include one or more input devices, such as a camera or a microphone, to allow a user to communicate with other users. Alternatively, or in addition, one or more interactive devices 110 may include one or more of these input devices for communication between users.

The interactive system 104 may also be configured to control verbal and non-verbal characteristics of a human-inhabited character 192. For example, input received by the interactive device 110 may be interpreted by the collaboration controller 102 to illustrate a non-verbal characteristic including an action state such as moving a hand or an arm of the human-inhabited character 192 in a writing motion on the virtual device 194 or the virtual white-board 196 to show the human inhabited character 192 is entering the content markup 182. Further, the collaboration controller 102 may transition other non-verbal characteristics including an appearance state (e.g., posture, facial expressions) of the human-inhabited character 192 due to the input from the interactive device 110. In an aspect, the collaboration controller 102 may use this input in combination with other inputs including, for example, visual or verbal behaviors captured by a camera or microphone of the interactive system 104.

Some interactive systems 104 may include a controller 124 for controlling the corresponding interactive device 110 and/or the corresponding immersive device 120 (e.g., HMD). In an example, the controller 124 may include one or more input components such as buttons, paddle sticks, or touchpads for receiving input from a user and location circuitry including, but not limited to accelerometers or gyroscopes, for determining a position, orientation, or rotation of the controller 124. In an aspect, the controller 124 may be physically connected to the corresponding interactive device 110 such that the position, orientation, or rotation of the controller 124 may be inherited by the virtual device 194 in the virtual environment 190. The physical connection between the controller 124 and the interactive device 110 may allow the virtual device 194 to be seen and interacted with in the virtual environment 190 by the user 170 without having to remove the immersive device 120 (e.g., HMD). Further, input received via the input components of the controller 124 may be received by the interactive device 110 and used to markup or manipulate the digital content 180 displayed on the interactive device 110.

As discussed herein, the digital content 180 and the content markup 182 may be synchronized such that the content markup 182 from a first interactive device 110 is displayed on one or more of second interactive devices 110 and/or in the virtual environment 190 of one or more of the immersive device 120 (e.g., in virtual device 194 and/or virtual white-board 196).

Synchronizing Data

Figure 2:
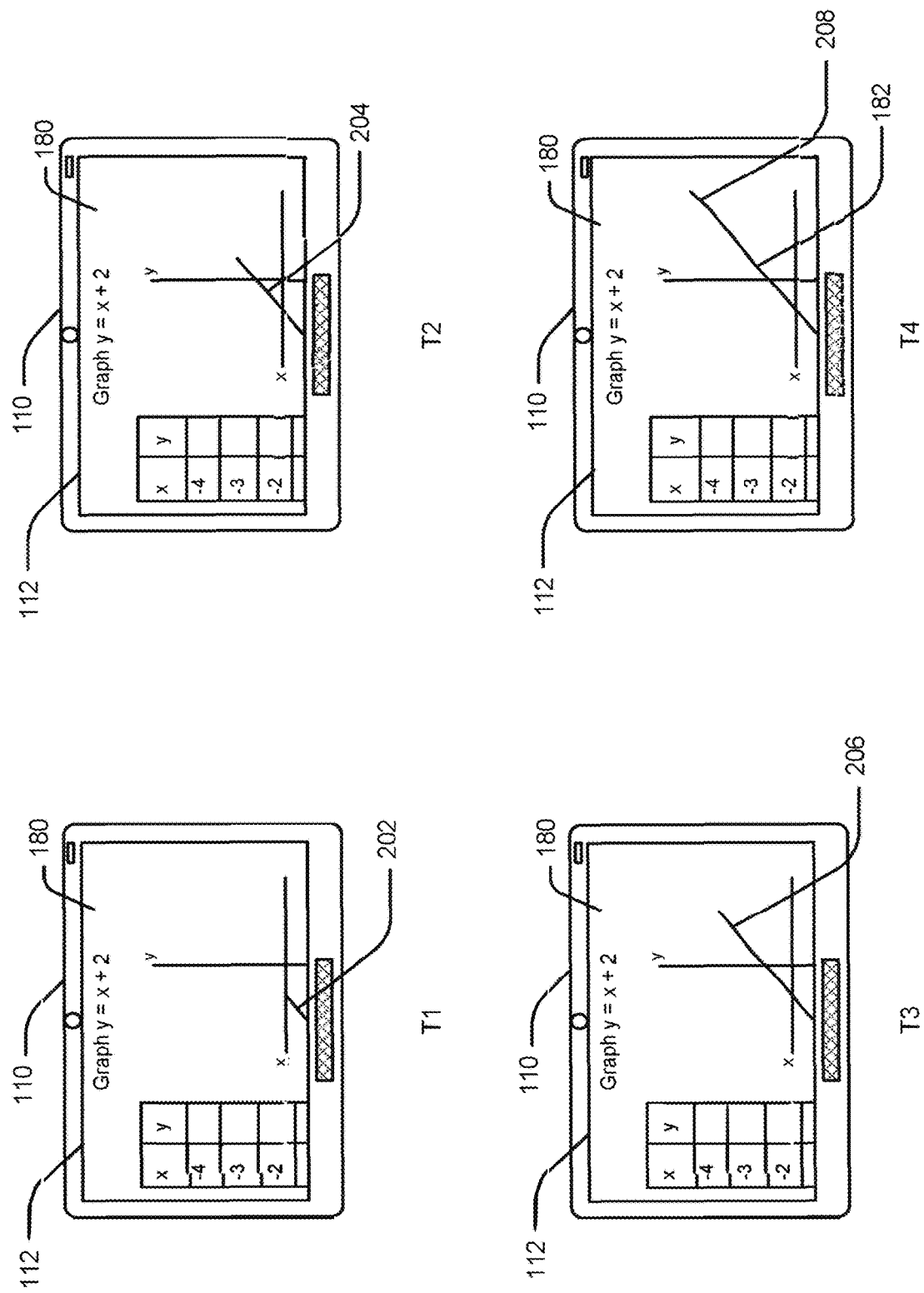
FIG. 2 is a conceptual diagram of synchronizing data by the system of FIG. 1, according to aspects of the present disclosure.

Referring to FIG. 2, each markup action (e.g., content markup 182) from any of the interactive devices 110 may be synchronized with other devices while still allowing each of the interactive devices 110 to continue to receive user input to simultaneously markup the digital content 180. In an example, if the digital content 180 is stored on each interactive device 110, a integer identifier may be sent from the collaboration controller 102 via the network 106 to the respective interactive device 110 to indicate which content to display. In the event the digital content 180 is not stored on one or more interactive devices 110, the collaboration controller 102 may send the digital content 180 (e.g., a lossless image) to the interactive devices 110. In an aspect, the digital content 180 may include location values indicating a location points of the digital content 180 based on a coordinate system (e.g., Cartesian coordinates).

To synchronize the content markups 182, the interactive devices 110 may transmit each markup stroke to the collaboration controller 102, where a markup stroke may consist of a starting point, a stopping point, and a time value, and, in some examples a color, or a tool (highlighter, pen, etc.) In an aspect, the starting point and the stopping point may be identified based on the location points of the digital content 180. For example, a starting point may be identified by integers indicating x and y locations corresponding to the digital content 180.

In an example, the markup strokes may be sent reliably, but without any guarantee of order. As a result, the time value (e.g., T1-T4) may be used to reconstruct the content markup 182 as the markup strokes from any of the interactive devices 110 may be received by the collaboration controller 102 out of order. In an example, the collaboration controller 102 stores a markup stroke and the last received time value for each pixel. When the collaboration controller 102 receives a new markup stroke at a more recent time, the collaboration controller 102 draws the markup stroke on a new texture. A shader (e.g., shader 520 of FIG. 5) can then be used to combine the new texture with the rest of the markup based on the digital editing tool that was used by the respective interactive device 110. For example, a pen tool may simply be drawn on top of pixels with older time values and completely discarded on pixels with more recent time values. In another example, the highlighter tool may use both the time value and an alpha value of the original pixel to construct a markup.

As an example, as illustrated by FIG. 2, the collaboration controller 102 may receive and store start and stop points for markup stroke 202 at time T1, markup stroke 204 at time T2, markup stroke 206 at time T3, and markup stroke 208 at time T4. As each of these markup strokes are received, the shader may combine these markup strokes to eventually form the content markup 182.

Methods of Implementation

Figure 3:
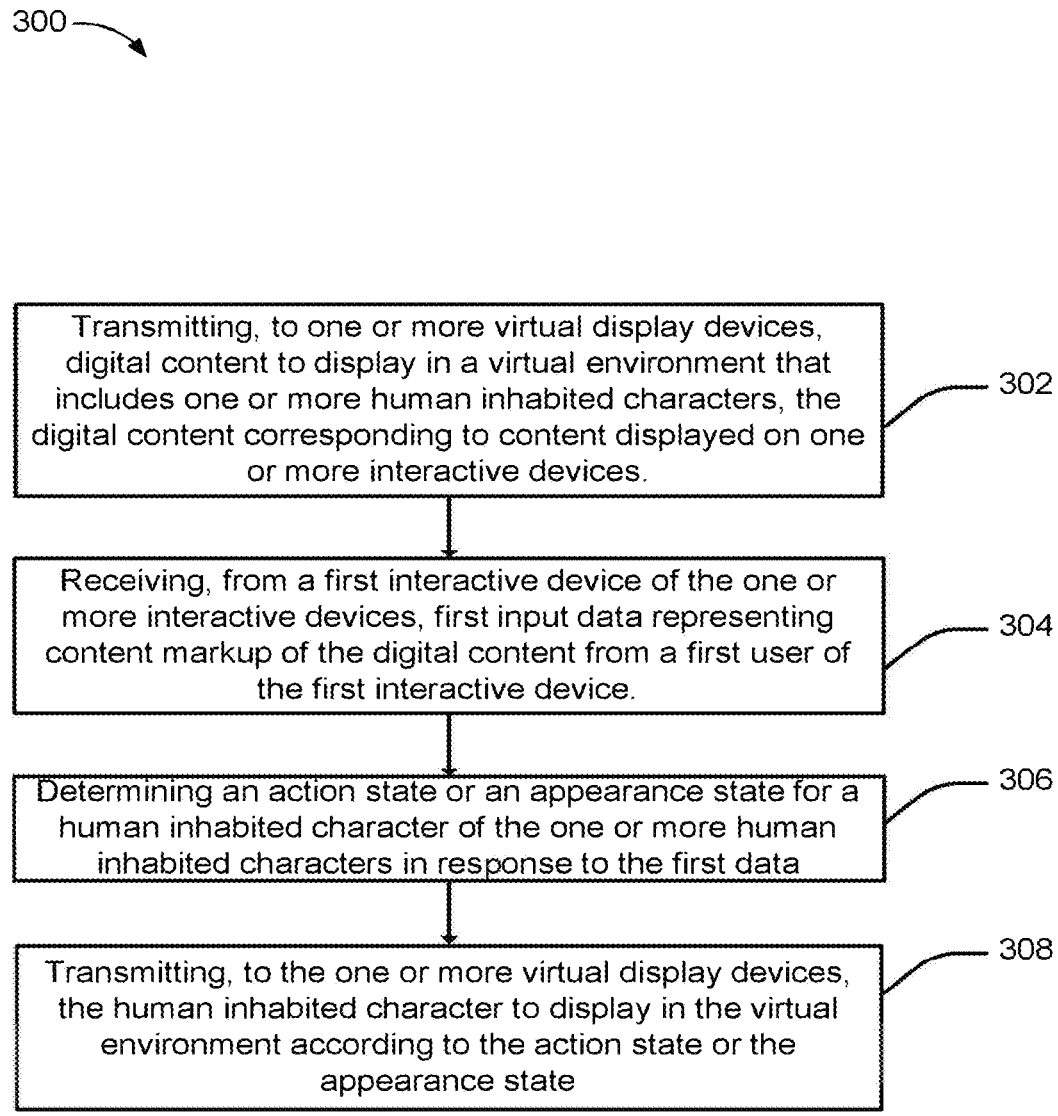
FIG. 3 is a flowchart of an example method for collaborating physical-virtual interfaces by the system of FIG. 1, according to aspects of the present disclosure.

Referring to FIG. 3, an example method 300 for collaborating physical-virtual interfaces is depicted. In an example, the method 300 may be performed by one or more components of the computing device 500 of FIG. 5, which is an example of one or more of the interactive device 110 or the immersive device 120. Examples of some of the operations of the method 300 may be described in relation to FIGS. 1 and 2.

At 302, the method 300 may include transmitting, to one or more immersive devices, digital content to display in a virtual environment that includes one or more human inhabited characters, the digital content corresponding to content displayed on one or more interactive devices. For example, the collaboration controller 102 (or a processor 502 or a communications component 506 of the collaboration controller 102) may transmit, to the immersive devices 120, the digital content 180 to display in the virtual environment 190 that includes the human inhabited characters 192, the digital content 180 corresponding to content displayed on the interactive devices 110.

At 304, the method 300 may include receiving, from a first interactive device of the one or more interactive devices, first input data representing content markup of the digital content from a first user of the first interactive device. For example, the collaboration controller 102 (or a processor 502 of the collaboration controller 102) may receive, from the interactive device 110, the content markup 182 (or any one of markup strokes 202-208) representing content markup of the digital content 180 from the user 170 of the interactive device 110.

At 306, the method 300 may include determining an action state or an appearance state for a human inhabited character of the one or more human inhabited characters in response to the first data. For example, the collaboration controller 102 (or a processor 502 of the collaboration controller 102) may determine an action state or an appearance state for the human inhabited character 192 in response to the content markup 182. In an example, the action state may include an action (such as writing) of the human inhabited character corresponding to the content markup 182, and an appearance state may include a facial expression (such as looking at a virtual device that is being written on) of the human inhabited character 192 corresponding to the content markup 182.

At 308, the method 300 may include transmitting, to the one or more immersive devices, the human inhabited character to display in the virtual environment according to the action state or the appearance state. For example, the collaboration controller 102 (or a processor 502 or a communications component 506 of the collaboration controller 102) may transmit, to the immersive devices 120, the human inhabited character 192 to display in the virtual environment 190 according to the action state or the appearance state.

Figure 4:
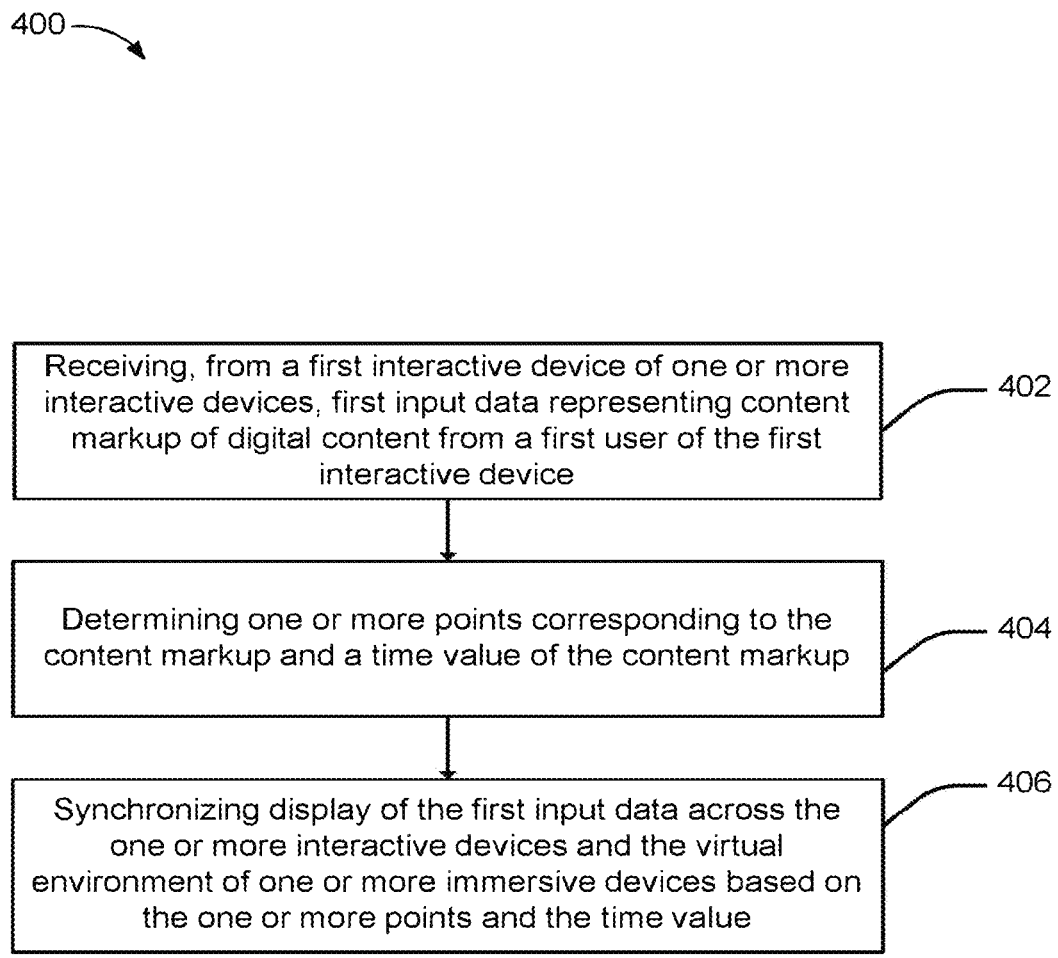
FIG. 4 is a flowchart of another example method for collaborating physical-virtual interfaces by the system of FIG. 1, according to aspects of the present disclosure.

Referring to FIG. 4, another example method 400 for collaborating physical-virtual interfaces is depicted. In an example, the method 400 may be performed by one or more components of the computing device 500 of FIG. 5, which is an example of one or more of the interactive device 110 or the immersive device 120. Examples of some of the operations of the method 400 may be described in relation to FIGS. 1 and 2.

At 402, the method 400 may include receiving, from a first interactive device of one or more interactive devices, first input data representing content markup of digital content from a first user of the first interactive device, the digital content to be display in a virtual environment that includes one or more human inhabited characters. For example, the collaboration controller 102 (or the processor 502 or the communications component 506 of the collaboration controller 102) may receive the markup stroke 202 (e.g., first input data) from the interactive device 110, wherein the markup stroke 202 represents content markup of the digital content 180. In one or more other examples, the first input data may include any of the markup strokes 202-208, and or a combination of one or more of these markup strokes.

At 404, the method 400 may include determining one or more points corresponding to the content markup and a time value of the content markup. For example, the collaboration controller 102 (or processor 502 of the collaboration controller 102) may determine one or more of a starting point or a stopping point of the markup stroke 202 and a time value of the markup stroke 202. In an example, the starting point or the stopping point may be integer values corresponding to a location of the points on the digital content 180.

At 406, the method 400 may include synchronizing display of the first input data across the one or more interactive devices and the virtual environment of one or more immersive devices based on the one or more points and the time value. For example, the collaboration controller 102 (or processor 502 of the collaboration controller 102) may synchronize display of the markup stroke 202 across the one or more interactive devices 110 and the virtual environment 190 of one or more immersive devices 120 based on the one or more points and the time value.

Figure 5:
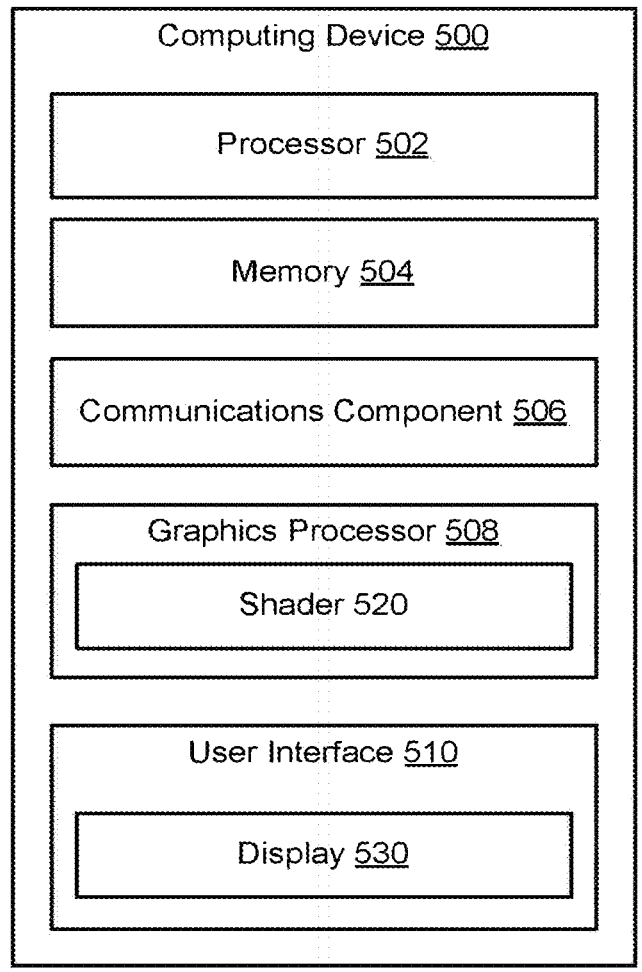
FIG. 5 is a block diagram of additional components of the computing device of FIG. 1, according to aspects of the present disclosure.

Referring to FIG. 5, illustrated is an example of components of a computing device 500 in accordance with an implementation. The computing device 500 may be an example of one or more of the collaboration controller 102, the interactive device 110, or the immersive device 120. In an example, the computing device 500 may include the processor 502 for carrying out processing functions associated with one or more of components and functions described herein. In an example, the processor 502 may also include a neural network to perform one or more operations described herein. The processor 502 may include a single or multiple set of processors or multi-core processors. Moreover, the processor 502 may be implemented as an integrated processing system and/or a distributed processing system.

In an example, the computing device 500 may include a memory 504 for storing instructions executable by the processor 502 for carrying out the functions described herein.

Further, the computing device 500 may include the communications component 506 that provides for establishing and maintaining communications with one or more parties utilizing hardware, software, and services as described herein. The communications component 506 may carry communications between components on the computing device 500, as well as between the computing devices 500 and/or external devices and devices located across a communications network and/or devices serially or locally connected to the computing device 500. For example, the communications component 506 may include one or more buses, and may further include transmit chain components and receive chain components associated with a transmitter and receiver, respectively, operable for interfacing with external devices.

The computing device 500 may also include a graphics processor 508 operable to render content for display on the computing device 500. The graphics processor 508 may include a shader 520 for rendering images on a display.

The computing device 500 may also include a user interface component 510 operable to receive inputs from a user of the computing device 500 and further operable to generate outputs for presentation to the user. The user interface component 510 may include one or more input devices including but not limited to a keyboard, a number pad, a camera, a mouse, an input controller, a touch-sensitive display 530 (e.g., display 112 or 122), a digitizer, a navigation key, a function key, a microphone, a voice recognition component, any other mechanism capable of receiving an input from a user, or any combination thereof. Further, the user interface component 510 may include one or more output devices, including but not limited to a display 530 (e.g., display 112 or 122), a speaker, a haptic feedback mechanism, a printer, any other mechanism capable of presenting an output to a user, or any combination thereof.

Figure 6:
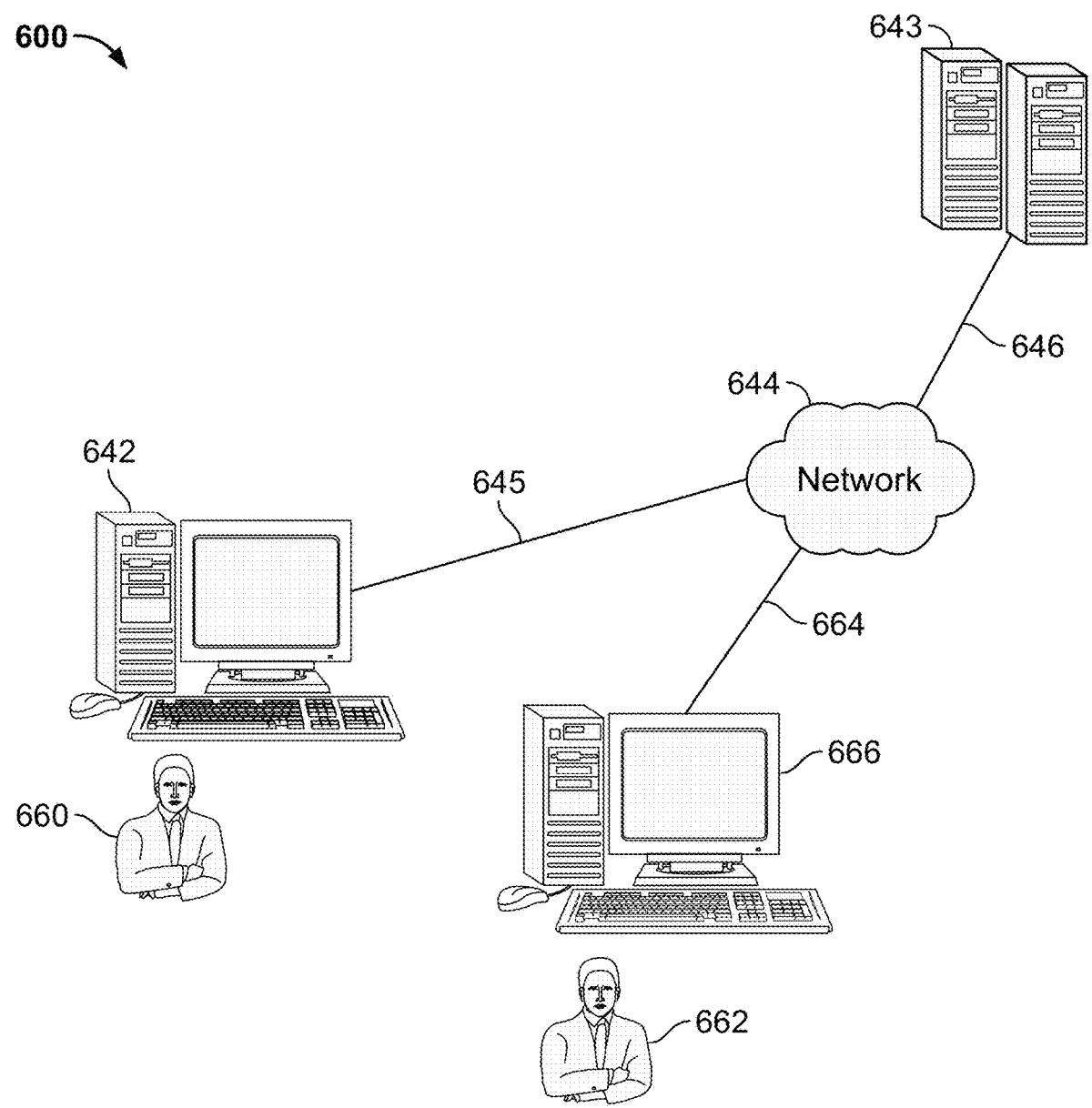
FIG. 6 is a block diagram of various exemplary system components, according to aspects of the present disclosure.

FIG. 6 is a block diagram of various example system components, in accordance with an aspect of the present disclosure. FIG. 6 illustrates a communication system 600 usable in accordance with aspects of the present disclosure. The communication system 600 may include one or more accessors 660, 662 (e.g., user 170) and one or more terminals 642, 666 (e.g., interactive device 110, immersive device 120, computing device 500). In an aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643 (e.g., collaboration controller 102), such as a PC, minicomputer, mainframe computer, microcomputer, or other device having a processor and a repository for data and/or connection to a repository for data, via, for example, a network 644 (e.g., network 106), such as the Internet or an intranet, and couplings 645, 646, 664. The couplings 645, 646, 664 include, for example, wired, wireless, or fiberoptic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method for collaborating physical-virtual interfaces, comprising:
    transmitting, to one or more immersive devices being used by one or more immersive device users, digital content to display in a virtual environment that includes one or more human inhabited characters and a virtual device;
    receiving, from a first interactive device of one or more interactive devices, first input data representing content markup of the digital content from a first interactive device user of the first interactive device, wherein the first input data includes a first markup stroke and a second markup stroke, wherein the first markup stroke includes a first starting point, a first stopping point and a first time value, wherein the second markup stroke includes a second starting point, a second stopping point and a second time value, wherein at least one of the one or more immersive device users is different than the first interactive device user, wherein the first interactive device is physically connected to a controller, wherein the controller has a corresponding position, orientation, or rotation;
    determining an action state or an appearance state for a human inhabited character of the one or more human inhabited characters in response to the first input data;
    transmitting, to the one or more immersive devices, the human inhabited character and the virtual device to display in the virtual environment according to the action state or the appearance state, wherein the action state or the appearance state for the human inhabited character is displayed via the one or more immersive devices, wherein the corresponding position, orientation, or rotation of the controller is inherited by the virtual device in the virtual environment; and synchronizing the first input data across the one or more interactive devices and the one or more immersive devices, comprising:
  comparing the first time value with the second time value;
  determining that the second time value is more recent than the first time value; and
  in the event that the second time value is more recent than the first time value:
    drawing the first markup stroke on a new texture; and
    drawing the second markup stroke on the new texture, comprising:
      identifying pixels where the first markup stroke overlaps the second markup stroke to obtain an overlapping area;
      drawing the second markup stroke in the overlapping area; and
      discarding pixels relating to the first markup stroke in the overlapping area.

2. The method of claim 1, further comprising:
transmitting, to the one or more immersive devices, the first input data to display in the virtual environment.

3. The method of claim 1, further comprising:
transmitting, to the one or more interactive devices, the first input data to display.

4. The method of claim 1, wherein the content markup comprises input based on one or more digital editing tools.

5. The method of claim 1, wherein the determining the action state or the appearance state for the human inhabited character comprises:
  detecting first user information in the first input data; and
  transitioning the human inhabited character from a current action state or a current appearance state to a next action state or a next appearance state in response to the detecting the first user information.

6. The method of claim 5, wherein the first user information includes one or more behaviors associated with the first input data.

7. The method of claim 1, further comprising:
transmitting, to the one or more immersive devices, a virtual device to display in the virtual environment, the virtual device representing a virtual rendering of the first interactive device;
obtaining one or more of a position or an orientation of a controller physically connected to and communicatively coupled with the first interactive device; and
transmitting, to the one or more immersive devices, the virtual device to display according to the one or more of the position or the orientation of the controller.

8. The method of claim 7, further comprising:
determining the action state or the appearance state for the human inhabited character further in response to the one or more of the position or the orientation of the controller.

9. The method of claim 1, wherein:
determining the action state or the appearance state comprises determining the appearance state; and
transmitting the human inhabited character comprises transmitting the human inhabited character according to the appearance state.

10. A method for collaborating physical-virtual interfaces, comprising:
  receiving, from a first interactive device of one or more interactive devices, first input data representing content markup of digital content from a first interactive device user of the first interactive device, the digital content to be display in a virtual environment that includes one or more human inhabited characters and a virtual device, wherein the first interactive device is physically connected to a controller, wherein the controller has a corresponding position, orientation, or rotation;
  determining a plurality of points corresponding to the content markup and a time value of the content markup, wherein the content markup includes a first markup stroke and a second markup stroke, wherein the first markup stroke includes a first starting point, a first stopping point and a first time value, wherein the second markup stroke includes a second starting point, a second stopping point and a second time value; and
  synchronizing display of the first input data in the virtual device in the virtual environment across the one or more interactive devices based on the plurality of points and the time value, wherein the content markup of the digital content is displayed via one or more immersive devices being used by one or more immersive device users, wherein at least one of the one or more immersive device users is different than the first interactive device user, wherein the corresponding position, orientation, or rotation of the controller is inherited by the virtual device in the virtual environment, wherein the synchronizing of the display comprises:
    comparing the first time value with the second time value;
    determining that the second time value is more recent than the first time value; and
    in the event that the second time value is more recent than the first time value:
      drawing the first markup stroke on a new texture; and
      drawing the second markup stroke on the new texture, comprising:
        identifying pixels where the first markup stroke overlaps the second markup stroke to obtain an overlapping area;
        drawing the second markup stroke in the overlapping area; and
        discarding pixels relating to the first markup stroke in the overlapping area.

11. The method of claim 10, wherein the content markup comprises input based on one or more digital editing tools.

12. The method of claim 10, further comprising:
combining the first input data with previously received input data to render the content markup.

13. The method of claim 10, wherein synchronizing the display of the first input data comprises synchronizing without the use of a collaboration controller.

14. A computing device, comprising:
  a non-transitory computer readable memory storing instructions; and
  a processor communicatively coupled with the non-transitory computer readable memory and configured to:
    transmit, to one or more immersive devices being used by one or more immersive device users, digital content to display in a virtual environment that includes one or more human inhabited characters and a virtual device, the digital content corresponding to content displayed on one or more interactive devices;
    receive, from a first interactive device of the one or more interactive devices, first input data representing content markup of the digital content from a first interactive device user of the first interactive device, wherein the first input data includes a first markup stroke and a second markup stroke, wherein the first markup stroke includes a first starting point, a first stopping point and a first time value, wherein the second markup stroke includes a second starting point, a second stopping point and a second time value, wherein at least one of the one or more immersive device users is different than the first interactive device user, wherein the first interactive device is physically connected to a controller, wherein the controller has a corresponding position, orientation, or rotation;

determine an action state or an appearance state for a human inhabited character of the one or more human inhabited characters in response to the first input data;

transmit, to the one or more immersive devices, the human inhabited character and the virtual device to display in the virtual environment according to the action state or the appearance state, wherein the action state or the appearance state for the human inhabited character is displayed via the one or more immersive devices, wherein the corresponding position, orientation, or rotation of the controller is inherited by the virtual device in the virtual environment; and synchronize the first input data across the one or more interactive devices and the one or more immersive devices, comprising to:
  compare the first time value with the second time value;
  determine that the second time value is more recent than the first time value; and
  in the event that the second time value is more recent than the first time value:
    draw the first markup stroke on a new texture; and
    draw the second markup stroke on the new texture, comprising to:
      identify pixels where the first markup stroke overlaps the second markup stroke to obtain an overlapping area;
      draw the second markup stroke in the overlapping area; and
      discard pixels relating to the first markup stroke in the overlapping area.

15. The computing device of claim 14, wherein the processor is further configured to:
transmit, to the one or more immersive devices, the first input data to display in the virtual environment.

16. The computing device of claim 14, wherein the processor is further configured to:
transmit, to the one or more interactive devices, the first input data to display.

17. The computing device of claim 14, wherein the content markup comprises input based on one or more digital editing tools.

18. The computing device of claim 14, wherein the processor is further configured to:
detect first user information in the first input data; and
transition the human inhabited character from a current action state or a current appearance state to a next action state or a next appearance state in response to the first user information being detected.

19. A computing device, comprising:
a non-transitory computer readable memory storing instructions; and
a processor communicatively coupled with the non-transitory computer readable memory and configured to:
  receive, from a first interactive device of one or more interactive devices, first input data representing content markup of digital content from a first interactive device user of the first interactive device, the digital content to be displayed in a virtual environment that includes one or more human inhabited characters and a virtual device, wherein the first interactive device is physically connected to a controller, wherein the controller has a corresponding position, orientation, or rotation;
  determine a plurality of points corresponding to the content markup and a time value of the content markup, wherein the content markup includes a first markup stroke and a second markup stroke, wherein the first markup stroke includes a first starting point, a first stopping point and a first time value, wherein the second markup stroke includes a second starting point, a second stopping point and a second time value; and
  synchronize display of the first input data in the virtual device in the virtual environment across the one or more interactive devices based on the plurality of points and the time value, wherein the content markup of the digital content is displayed via one or more immersive devices being used by one or more immersive device users, wherein at least one of the one or more immersive device users is different than the first interactive device user, wherein the corresponding position, orientation, or rotation of the controller is inherited by the virtual device in the virtual environment, wherein the synchronizing of the display comprises to:
    compare the first time value with the second time value;
    determine that the second time value is more recent than the first time value; and
    in the event that the second time value is more recent than the first time value:
      draw the first markup stroke on a new texture; and
      draw the second markup stroke on the new texture, comprising to:
        identify pixels where the first markup stroke overlaps the second markup stroke to obtain an overlapping area;
        draw the second markup stroke in the overlapping area; and
        discard pixels relating to the first markup stroke in the overlapping area.

20. The computing device of claim 19, wherein the content markup comprises input based on one or more digital editing tools.

* * * * *